April 10, 1934.  G. VIARD  1,954,396

METHOD OF AND APPARATUS FOR MEASURING TRANSMISSION LEVELS

Filed Oct. 31, 1931

INVENTOR
Georges Viard
by Stone, Boyden, Mack & Hahn,
ATTORNEYS

Patented Apr. 10, 1934

1,954,396

UNITED STATES PATENT OFFICE 1,954,396

METHOD OF AND APPARATUS FOR MEASURING TRANSMISSION LEVELS

Georges Viard, Paris, France, assignor to Lignes Telegraphiques et Telephoniques, Paris, France, a corporation of France Application October 31, 1931, Serial No. 572,369
In France November 14, 1930

11 Claims. (Cl. 179—175.3)

This invention relates to the measurement of transmission levels on telecommunication circuits.

The transmission level at a point in a telecommunication system is determined by the ratio of the power measured at this point to a power chosen as a standard for comparison. Power measurements offer greater difficulties than the corresponding voltage measurements and as it is easy to deduce the power level from the voltage level, which latter is similarly determined by the ratio of the voltage at the point considered to a voltage chosen as a standard for comparison, it is always the voltage level that is measured in practice.

The object of the present invention is to provide a method of and an apparatus for measuring voltage levels, applicable, more particularly, to the measurement of amplifier output levels. For measuring voltage levels it has been common practice hitherto to employ, for comparison purposes, a local generator for generating an arbitrary voltage which is used to obtain a balance against the voltage from the circuit under test. A feature of this invention is that such local generator is abolished by deriving, or "borrowing", the required arbitrary voltage from the circuit itself. Further features and objects of the invention will appear more fully from the following description thereof.

In order to make the invention clearer and to prevent confusion between terms, the expression "reference voltage" appearing hereinafter and in the appended claims refers to the arbitrary voltage above-mentioned, used for balancing purposes, and is to be distinguished from the standard comparison voltage, mentioned at the commencement of this specification, in terms of which the actual voltage level is deduced.

Figure 1:
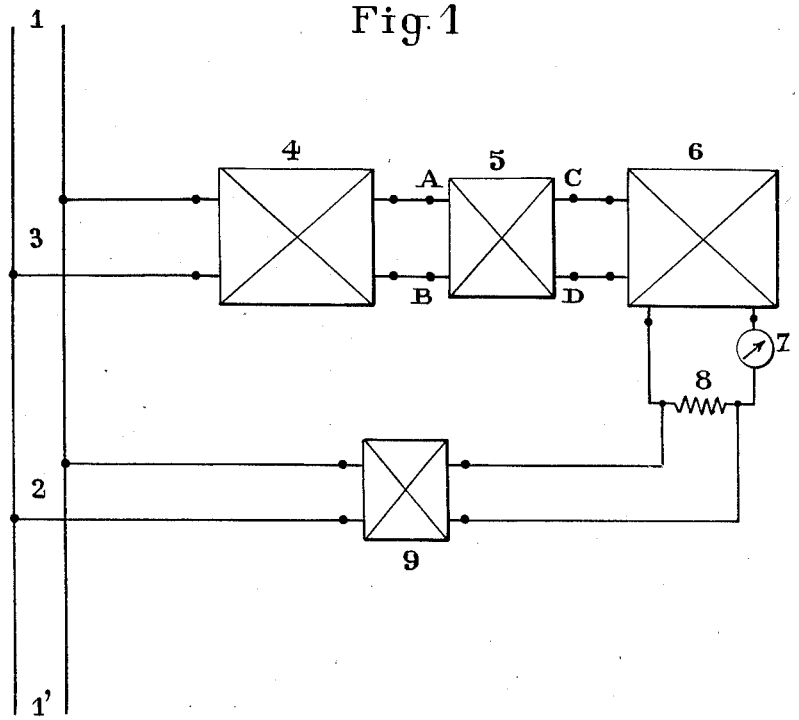
Figure 2:
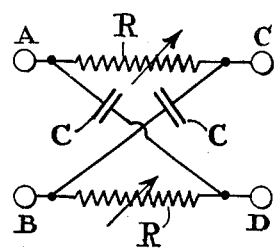

For a better understanding of the invention, reference will be had to the following description taken in conjunction with the accompanying drawing illustrating the invention. Fig. 1 shows diagrammatically the general layout of the apparatus, while Fig. 2 illustrates a detail.

In Fig. 1, 1 ,1' denotes the transmission line, to which the terminals 2 of the measuring apparatus are connected at the point where it is desired to measure the voltage level. The reference voltage is taken from the line at a neighbouring point 3 suitably chosen. The points 2 and 3 may be merged together.

The voltage at the terminals 3 is amplified by the voltage amplifier 4 which has a very high input impedance so as not to disturb appreciably the working of the line. This amplifier has a fixed gain. The amplified voltage is fed through a phase-changing device 5 to a power amplifier 6 which has a variable gain. A measuring device 7 calibrated in voltage levels and a fixed resistance 8 are connected in series across the output of this amplifier and by means of the power amplifier 6, the modulation of the voltage at the terminals of the resistance 8 may be varied. This voltage is applied to an indicating apparatus 9 connected to the line at 2. This apparatus possesses a very high impedance in order to avoid interaction between the amplifiers 6 and 4.

The phase-changing device 5 allows of varying the phase of the voltage at the terminals of the resistance 8 and varies the phase of the current without changing its amplitude. Fig. 2 shows diagrammatically one form of phase-changer, although several types are already known per se. The device comprises two fixed condensers C of equal capacity and two variable equal resistances R connected as shown between the terminals AB and CD. As the circuit connected to the terminals of CD does not absorb current, the voltage between CD is equal in modulation to the voltage at the terminals of AB, the two voltages being displaced by an angle $\phi$, given by:

$$\tan\frac{\phi}{2} = RC\omega$$

where $\omega$ is the pulsatance of the voltage measured.

If the voltages impressed on the indicating apparatus 9 from the line 1, 1' and resistance 8 respectively are equal in modulation and opposite in phase, this apparatus will not be traversed by any current. Thus, to make a measurement, one varies the gain of the amplifier 6 and simultaneously manipulates the phase-changing apparatus 5 until the indicating apparatus 9 becomes dead. When this condition is reached, the voltage level is read directly from the calibrated instrument 7.

The indicating apparatus may advantageously be a high impedance telephone receiver, which, in the hands of a skilled operator, enables measurements to be made with great accuracy. Moreover, his trained ear will easily take advantage of the effect of the harmonics which may be found in the voltage to be measured. In this case, the variables are manipulated until no sound is heard in the telephone, the voltage level then being read from the instrument 7 as before.

In the preceding description, the modulation of the reference voltage has been adapted to that of the voltage to be measured by varying the gain of an amplifier, but the same result could be obtained by using an amplifier having a fixed gain in conjunction with a voltage reducer, or further, by means of the two devices.

I claim:

1. Method of measuring the voltage level at a point in an electrical circuit, which comprises applying voltage from said circuit to an indicating device, applying voltage from said circuit to a voltage amplifier to serve as a reference voltage, shifting the phase of said reference voltage with respect to that of the voltage applied to said indicating device until the phases of said voltages are in opposition, modulating said reference voltage until the modulation is equal to that of the voltage to be measured, thereafter metering said reference voltage and then impressing said reference voltage on said indicating device.

2. Apparatus for measuring voltages and voltage levels, comprising an indicating device, means for applying thereto voltage under test, means for applying thereto voltage derived from the same source as the voltage under test, serving as a reference voltage, metering means for said reference voltage and means for balancing said voltages in said indicating device to produce a zero indication therein, said last-named means comprising in combination a phase-changing device and a modulator.

3. Apparatus for measuring voltages and voltage levels, comprising an indicating device, means for applying thereto voltage under test, means for applying thereto voltage derived from the same source as the voltage under test, serving as a reference voltage, means for preliminarily amplifying said reference voltage, metering means for said reference voltage, and means for balancing said voltages in said indicating device to produce a zero indication therein, said last-named means comprising in combination a phase-changing device and a modulator.

4. Apparatus for measuring voltages and voltage levels, comprising an indicating device, means for applying thereto voltage under test, means for applying thereto voltage derived from the same source as the voltage under test, serving as a reference voltage, means for preliminarily amplifying said reference voltage, means for balancing said voltages in said indicating device to produce a zero indication, said last-named means comprising in combination a phase-changing device, a modulator and a fixed ohmic resistance connected across the output of said modulator and also across the input to said indicating device, metering means being connected in series with said ohmic resistance in the output of said modulator.

5. Method of measuring the voltage level at a point in a telecommunication circuit which comprises applying the voltage at the point to be measured and the voltage at an adjacent point thereto simultaneously along two conducting paths to a common indicating device, utilizing the voltage in one path as a reference voltage, adjusting the modulation and phase of said reference voltage to neutralize the effect on said indicating device of said voltage under measurement in the other path, and thereafter metering said reference voltage.

6. Method of measuring an alternating voltage at a point on a telecommunication line, which comprises applying said voltage along one path directly to an indicating device, applying an alternating reference voltage derived from said line to said device along a second, separate, path and in opposition to said first-mentioned voltage, adjusting the modulation and phase of said alternating reference voltage to produce a zero indication in said indicating device, and thereafter metering said reference voltage.

7. Apparatus for measuring voltages and voltage levels on a telecommunication line, which comprises a zero-indicating device, two separate paths for connecting said device with said line, one of said paths being direct and the other including in combination means for amplifying voltage derived from said line, means for adjusting the modulation and phase of said amplified voltage, and calibrated metering means for said voltage, means being further provided for applying the respective inputs to said zero-indicating device from said paths in opposition to each other.

8. Apparatus for measuring the voltage level at a point in a transmission line, which comprises in combination an amplifier and an indicating device both adapted for direct connection across said line at a common point or at adjacent points, said amplifier and indicating device each being adapted to present a high impedance to currents transmitted over said line, a phase-changing network and a modulator associated with said amplifier for respectively adjusting the phase and modulation of voltage derived from said line and amplified by said amplifier to serve as a reference voltage, means for thereafter metering said reference voltage, comprising a device calibrated in voltage levels, means for applying said reference voltage, after metering, to said indicating device simultaneously with and in opposition to voltage applied to said device direct from said line.

9. Apparatus for measuring voltages and voltage levels on a telecommunication line, which comprises in combination a fixed gain amplifier, a calibrated measuring instrument and a fixed resistance, means for said amplifier to transmit voltage derived from said line to both said instrument and resistance, an indicating device, means for simultaneously applying voltage from said resistance and voltage direct from said line to said indicating device, and means for adjusting the phase and modulation of the voltage applied to said resistance to produce a zero indication in said indicating device.

10. Apparatus as defined by claim 8, wherein the said amplifier has a fixed gain.

11. Apparatus as defined by claim 8, wherein the said modulator comprises an amplifier having a variable gain.

GEORGES VIARD.